United States Patent [19]
Garrett

[11] Patent Number: 6,021,436
[45] Date of Patent: Feb. 1, 2000

[54] AUTOMATIC METHOD FOR POLLING A PLURALITY OF HETEROGENEOUS COMPUTER SYSTEMS

[75] Inventor: Brian Garrett, Hopkinton, Mass.

[73] Assignee: EMC Corporation, Hopkinton, Mass.

[21] Appl. No.: 08/853,964

[22] Filed: May 9, 1997

[51] Int. Cl.[7] .................................................. G06F 13/00
[52] U.S. Cl. ............................................ 709/224; 714/47
[58] Field of Search .................... 395/200.53, 200.54, 395/184.01, 182.02; 709/223–224; 714/3, 47

[56] References Cited

U.S. PATENT DOCUMENTS

| | | | |
|---|---|---|---|
| 4,996,703 | 2/1991 | Gray | 379/40 |
| 5,442,791 | 8/1995 | Wrabetz et al. | 395/674 |
| 5,612,898 | 3/1997 | Huckins | 395/200.54 |
| 5,627,766 | 5/1997 | Beaven | 702/122 |
| 5,668,944 | 9/1997 | Berry | 395/184.01 |
| 5,671,414 | 9/1997 | Nicolet | 395/684 |
| 5,710,885 | 1/1998 | Bondi | 395/200.54 |
| 5,712,978 | 1/1998 | Lerner et al. | 395/200.54 |
| 5,715,393 | 2/1998 | Naugle | 395/200.54 |
| 5,745,692 | 4/1998 | Lohmann, II et al. | 395/200.53 |
| 5,751,966 | 5/1998 | Dauerer et al. | 395/200.54 |
| 5,758,071 | 5/1998 | Burgess | 395/200.5 |
| 5,764,913 | 6/1998 | Jancke et al. | 395/200.54 |
| 5,835,720 | 11/1998 | Nelson et al. | 709/224 |
| 5,862,404 | 1/1999 | Onaga | 710/8 |

*Primary Examiner*—Zarni Maung
*Assistant Examiner*—Andrew Caldwell
*Attorney, Agent, or Firm*—John M. Gunter, Esq.; Leanne J Fitzgerald, Esq.

[57] ABSTRACT

A method for polling a plurality heterogeneous computer systems remote from a host is provided. The method has the host containing first and second memory locations. In the first location the current day's collected information is stored. In a second location historical data compiled over a predetermined period of time is stored. The system has the host initially polling all of the plurality of heterogeneous computer systems concurrently to determine if they are active. If it is determined that a particular computer system is active, the system then runs through a series of commands to obtain desired information from the plurality of hosts. The host obtains the particular operating system and the particular version of each operating system that is running on each one of the plurality of heterogeneous computers. Once this information is obtained the host then can run certain specific commands for each particular operating system revision to ascertain additional information. In the preferred embodiment of the invention, the host can then ascertain if the plurality of heterogeneous computers are running desired test applications.

9 Claims, 6 Drawing Sheets

AUTOMATIC METHOD FOR POLLING A PLURALITY OF HETEROGENEOUS COMPUTER SYSTEMS

FIELD OF THE INVENTION

This invention relates generally to the polling and monitoring of computer systems, and more particularly to an automatic method of polling a plurality of heterogeneous computer systems.

BACKGROUND OF THE INVENTION

With the explosion of computers and computer networks, a typical computer lab may have many computers. As these computer labs have grown larger and larger, it has become increasingly difficult for personnel to be aware of what each and every computer is doing at a particular time.

Historically, large computer labs relied on a single proprietary system. For example, a large computer lab may have had one or two mainframe computers, where each computer had the same operating system. A smaller computer lab may have had several different types of computers, but typically all these computer systems would contain the same operating system. With the advent of "open" or UNIX operating systems, it is not uncommon for a computer lab to have computers using different types of operating systems within a single computer lab. A typical computer lab could have UNIX computers from Hewlett-Packard, Sun Microsystems, IBM, and Digital Equipment Corporation. Additionally, all of these different types of computers could also be part of a single computer network. The manager of the computer lab then has to be able to keep track of all these different types of computers. By keeping track, the manager may have to keep track of which computers are working at a particular time, and may also have to keep track of what is being operated on a particular computer. Even though all these computers may have UNIX operating systems, such UNIX operating systems are not the same. That is, each UNIX operating system differs according to the manufacturer of the computer.

These computers may be part of a processing system such as that contained in a data center, or could be used for other purposes. A typical purpose would be determining if each computer system was being used at a particular time or whether all the computers were actually running the particular task that they were supposed to at a given time. Previously finding out if the computers were active and what was being utilized on the computers was not a problem when all the computers in the lab have the same operating system, as the central host computer could simply communicate with each computer to find out the relevant information. As explained, current computer labs have different heterogeneous computer systems, earlier polling methods to determine that status and activity of the computers will not work.

Therefore, it is desired to have a method whereby a host is capable of effectively communicating with a plurality of remote computer systems, utilizing different or heterogeneous operating systems, and can ascertain desired information from the plurality of remote heterogeneous computers.

SUMMARY OF THE INVENTION

In accordance with the present invention, a method of polling a plurality of heterogeneous computer systems is provided. The method has a host computer which stores the most recent data in a first memory location. The most recent data is copied from the first memory location to a second memory location, where the most recent data is added to the historical data. Once the copying is done, the most recent data is deleted from the first memory location. Once the first memory location is cleared, the polling of the heterogeneous computers begins. The initial polling is to determine if each one of the plurality of heterogeneous computers is active. Each one of the plurality of heterogeneous computers which is active responds to the polling. For those of the heterogeneous computers which respond to the polling, commands are available from the host computer. The host then inquires, of those heterogeneous computers which responded to the polling, the particular operating system and the particular version of the operating system being utilized the heterogeneous computers. After obtaining this information, the host uses the commands for each particular operating system, including the correct version of the operating system, to determine if predetermined applications are actually being run on each of the heterogeneous computers which responded to the initial polling.

In accordance with another aspect of the present invention, a method for notifying personnel if at least one of a plurality of heterogeneous computers is not active is provided. In this method the most recent data is copied from a first location to a second location, and then, after the copying, is deleted from the first location. Polling of the plurality of heterogeneous computers is begun to determine which of the plurality of heterogeneous computer is not active. For those heterogeneous computers, which do not respond to the polling, this information is logged into the first location, and this information is then used to notify the personnel of the heterogeneous computers which are not active. Thus allowing the personnel to be aware of, and possibly respond to a situation where single or multiple heterogeneous computers are not active.

BRIEF DESCRIPTION OF THE DRAWINGS

The above and further advantages of the present invention may be better understood by referring to the following description taken into conjunction with the accompanying drawings in which.

DETAILED DESCRIPTION OF THE INVENTION

Figure 1:
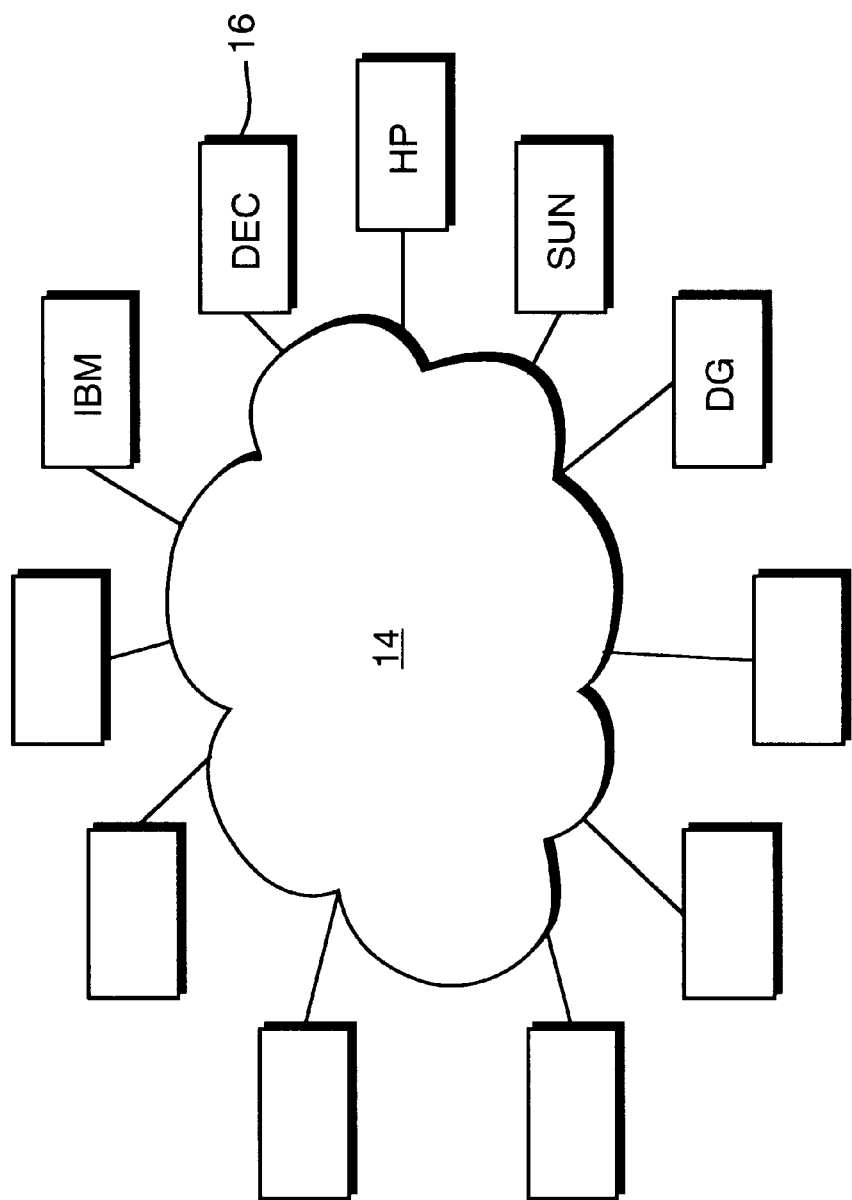
FIG. 1 is a block diagram of a host computer and a plurality of heterogeneous remote computers contained in a network according to the method of the present invention.

Referring to FIG. 1, a block diagram 10 of the present invention is shown. The block diagram 10 shows a host computer 12 connected by conventional means, such as small computer systems interface (SCSI) to a network 14.

Other known connections may also be used. The network 14 contains a plurality of heterogeneous computers 16 from the host computer 12. The plurality of heterogeneous computers 16 may be remote from the host computer 12, and may also themselves be host computers (not shown) In the preferred embodiment of the invention, the host computer 12 has a UNIX operating system, and could be any one of a number of computers, such as those manufactured by Sun Microsystems. The plurality of heterogeneous computers 16 have a plurality of different UNIX Computer Systems. For example the plurality of heterogeneous computers 16 may include an IBM, a Digital Equipment Corporation, a Sun Microsystems, a Hewlett-Packard, or Data General computer systems which each run their own respective versions of the UNIX operating system. Although these computer systems all have a UNIX operating system, these different UNIX operating systems will cause there to be differences in the communications between the host 12 and the plurality of different heterogeneous computer systems 16, thus preventing effective communication between the host computer 12 and the plurality of heterogeneous computers 16.

Figure 1A:
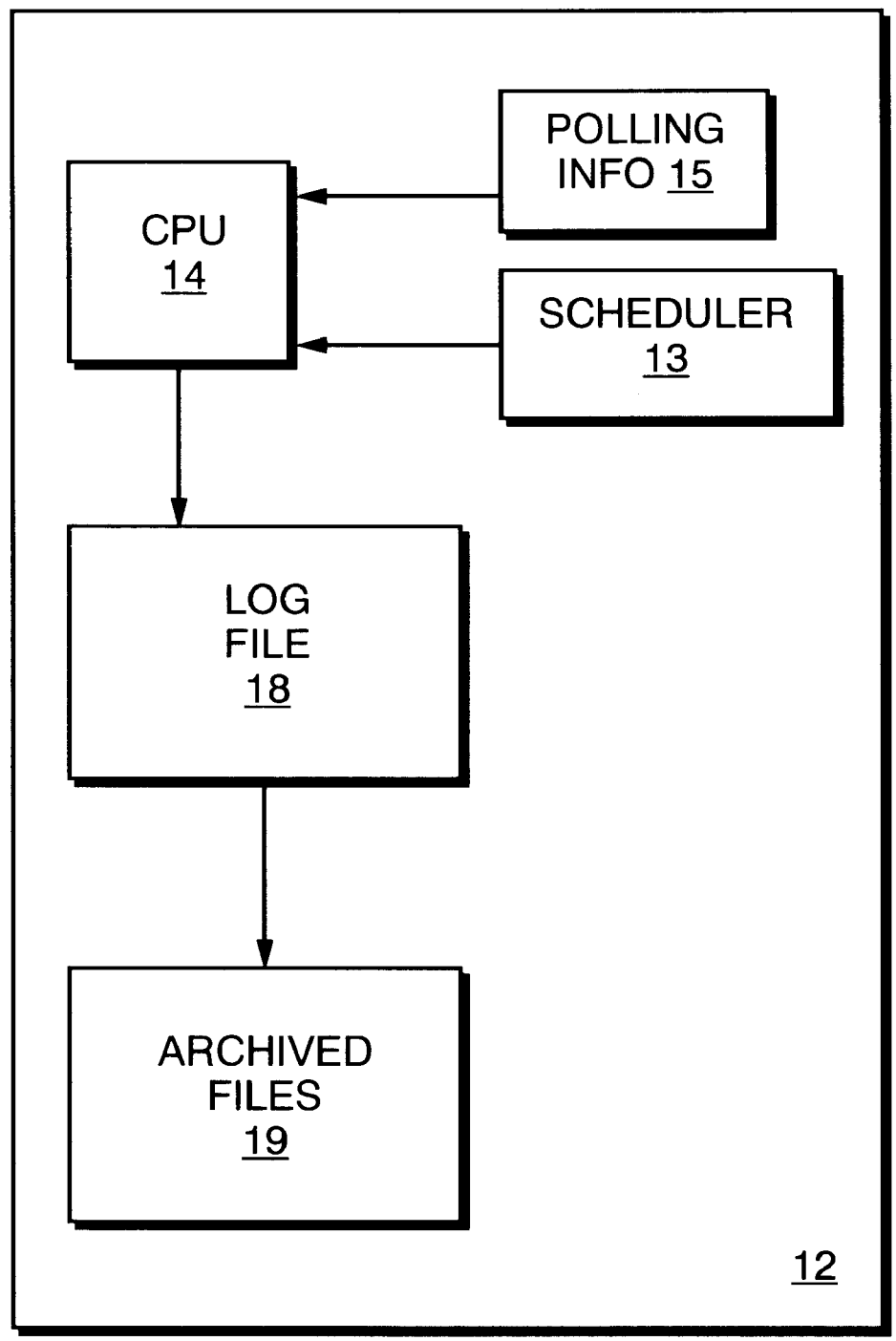
FIG. 1A is a block diagram of the host computer according to the method of the present invention.

Now referring to FIG. 1A, the host computer 12 is further shown. The host computer 12 contains a central processing unit (CPU) 14, a scheduler 13 connected to the CPU 14, an table 15 and first and second memory locations 18 and 19, all in communication with the CPU 14. As will be explained later, the polling of the present invention is done from the CPU 14. The scheduler 13 tells the host computer 12 when the polling is to begin. The table 15 contains specific commands particular to different UNIX operating systems. First memory location 18 is a log file which stores the results of the current days polling while second memory location 19 archives the results of the polling operations over a longer period. The memory locations 18 and 19 may be one or more storage devices, such as disk drives. In the preferred embodiment of the invention the results of the polling are stored for a significant period of time, and in fact may be stored for an indefinite period.

Once polling begins to take place (as later will be explained), the contents of the log file in first memory location 18 are transferred to the archive files at second memory location 19 and the first memory location 18 is cleaned out. Thus, host computer 12 by having the archive files in the second memory location 19 has a permanent record of the results of the polling activity that has taken place for a desired period of time.

Scheduler 13 is used to schedule the occurrence of a variety of events on the host 12. For example, scheduler 13 indicates to CPU 14 when polling should begin. As is known in the art of test applications, it is often desirable to run test applications during off hours. Thus, typically test applications on computers may be run from 2 a.m. to 6 a.m. in the morning. The CPU 14 wants to begin polling the plurality of heterogeneous computer systems 16 when the test applications are actually being run on the plurality of heterogeneous computer 16. The scheduler 13 is programmed to tell the CPU 14 when to begin the polling.

Table 15 is used to store specific commands. As will later be explained, once host computer 12 knows which UNIX operating system and the particular version of the UNIX operating system being run on a particular heterogeneous computer, the host computer 12 needs to communicate with said heterogeneous computers. Once the CPU 14 knows the UNIX operating system, including revision, it can read from the table 15 the proper commands for a particular heterogeneous computer.

Figure 2:
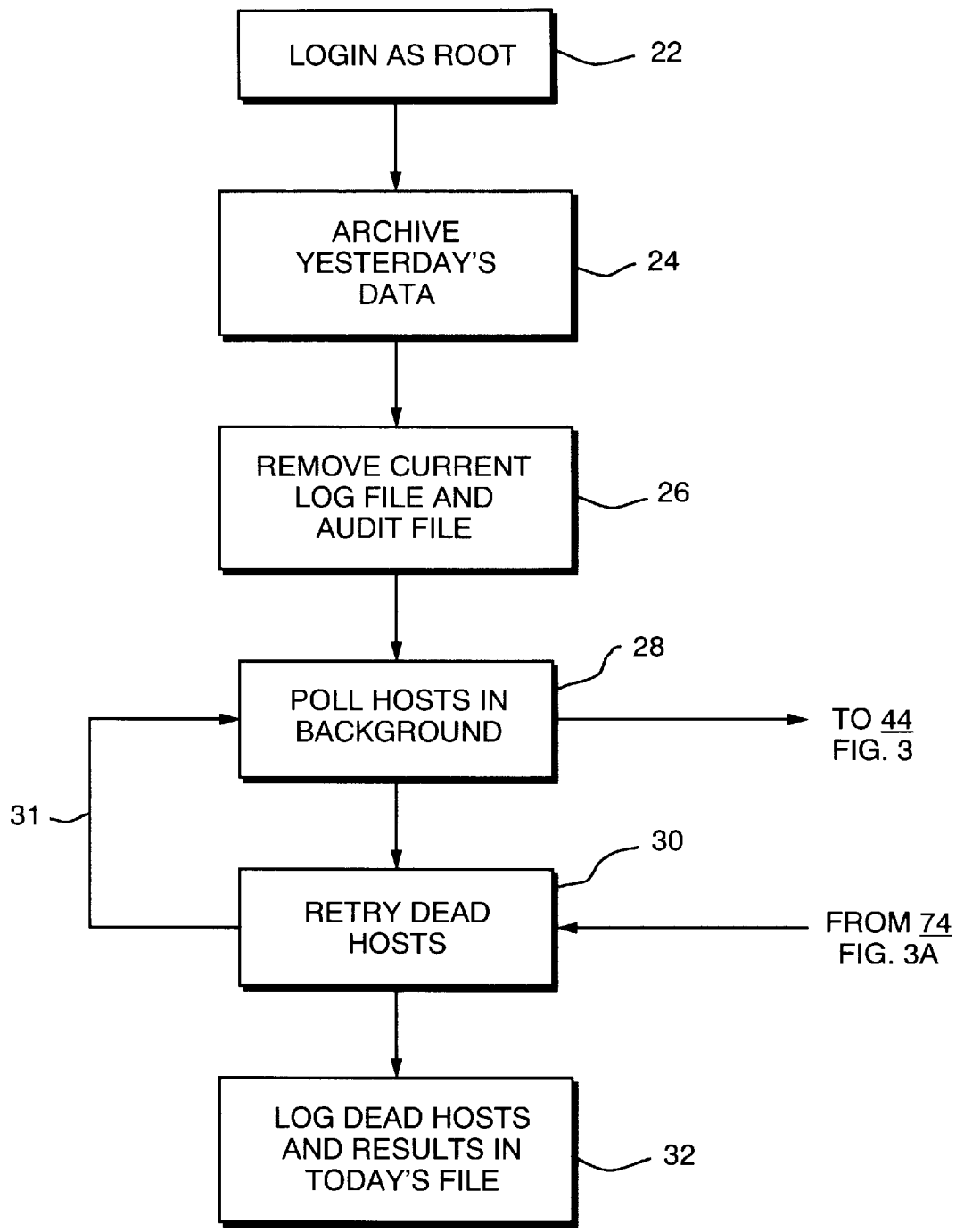
FIG. 2 is a flow diagram of the overall polling method according to the present invention.

Referring now to FIG. 2, flow diagram showing the overall or control method of the present invention is shown.

When the host computer 12 wants to begin, as informed by the scheduler 13 in FIG. 2, the polling process, first, a login has to be performed at step 22. This login cannot be any normal login, but as is known in UNIX operating systems, the login must be done as a root user. This status as a root user allows the host computer to gain access to the other computer systems contained on the network. The information permitting root user access is pre-programmed into the plurality of heterogeneous computers. Once the user has logged in as a root user, the system archives yesterday's data stored in the log file at step 24. That is, the data contained in the log file is moved from the log file (which is simply a record of all the data collected from the previous day) and such data is moved into the permanent archived file in step 24. After the previous days data is archived in step 24, the data is permanently deleted from the log file at step 26. In step 28 the host computer begins to poll the plurality of heterogeneous computers. In the preferred embodiment in the invention, plurality of heterogeneous computers are polled concurrently from the host computer. It should also be understood that the host could poll each of the remote heterogeneous computers one at a time but in the interest of efficiency, the computers are polled concurrently. Once the polling begins at step 28 the host computer begins to proceed through the method by actually running certain specified commands. However, if the host computer does not get a response from one or more of the plurality of heterogeneous computers the system will retry those heterogeneous computers which did not respond at step 30. If a response is not received a second time, the system then proceeds to step 32, in which the host computer will record in the log file that certain of the plurality of heterogeneous computers did not respond.

Figure 3:
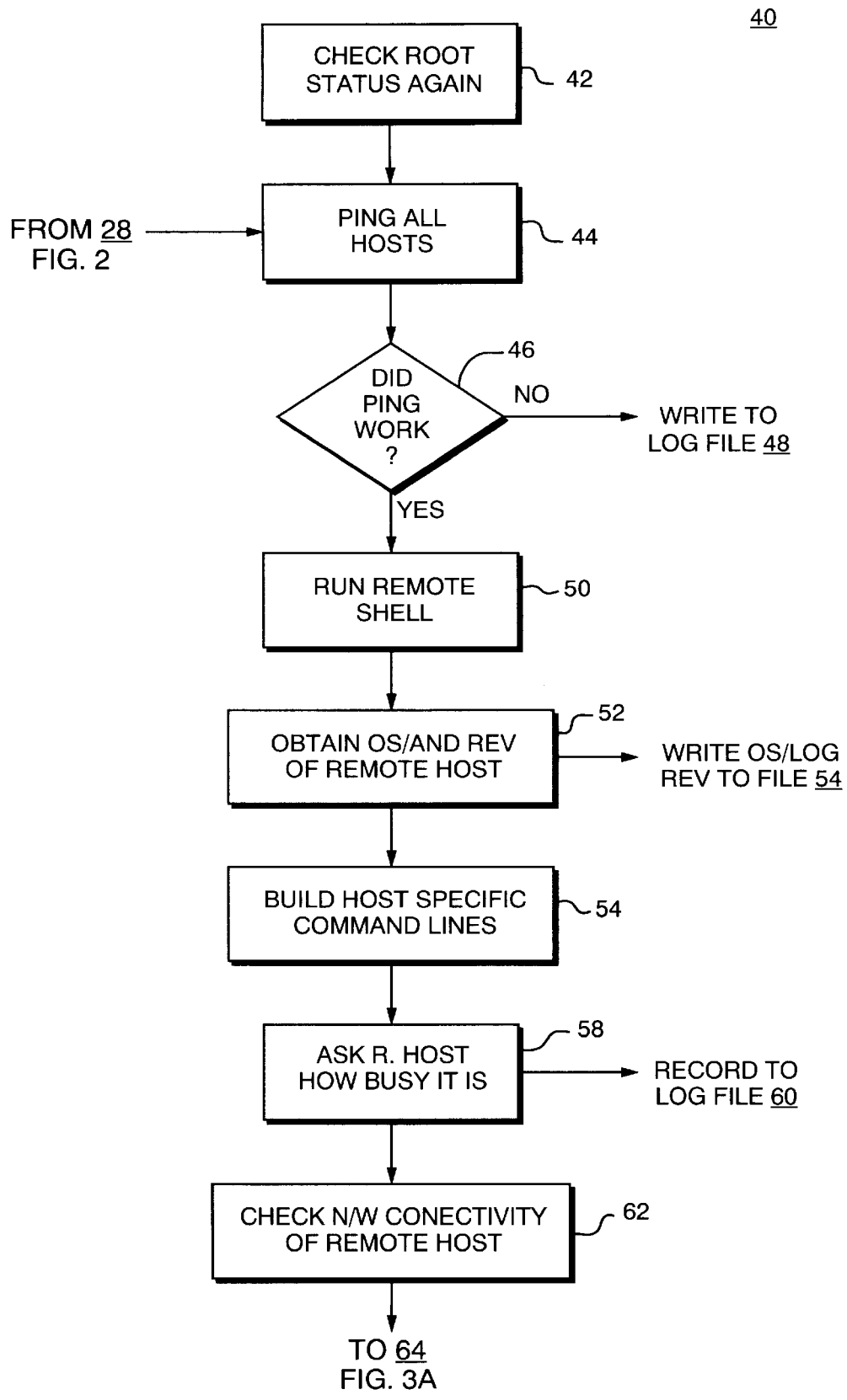
FIG. 3 is a flow diagram further illustrating the polling method according to the present invention.
Figure 3A:
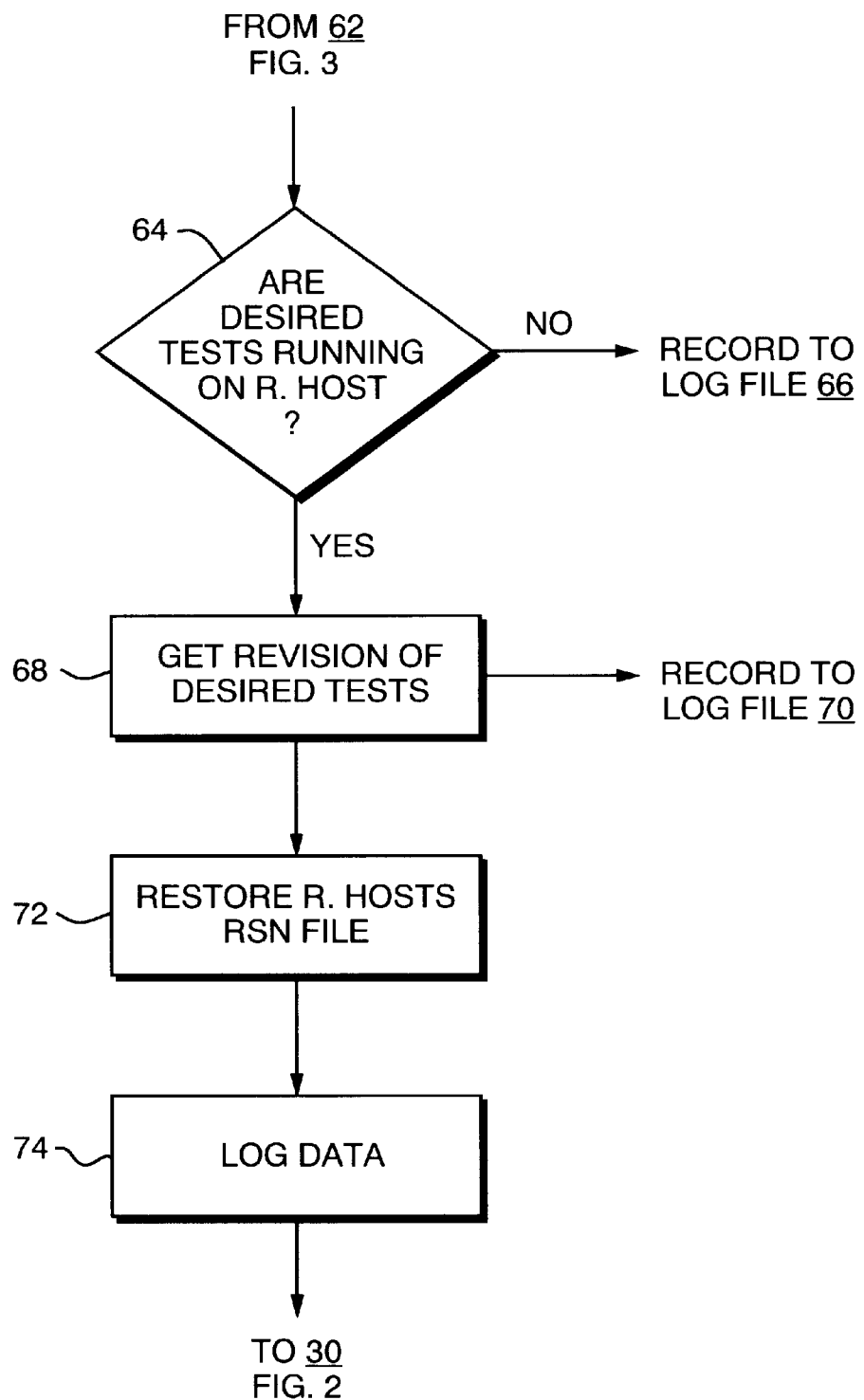
FIG. 3A is a flow diagram which is a continuation of FIG. 3 according to the method of the present invention.

Returning to step 28, once the polling of the host begins the system of the present invention proceeds to the flow diagram contained in FIGS. 3 and 3A, before returning to steps 30 and 32 in FIG. 2. Turning to step 42 in FIG. 3 the system will once again check the root status of the user of the host to make certain the host remains on root status. At step 44, as was indicated previously, the host computer will poll all of the plurality of heterogeneous computers. The host computer will send out to each one of the heterogeneous computers contained on the network, a command which is roughly the equivalent to "are you alive?" If there is not a response from any one of the heterogeneous computers, the method will write to the log file that the attempted contact with the remote heterogeneous computer(s) was not successful at step 46. If the results of step 46 are not positive, referring once again to FIG. 2, step 30, the host computer, will after a designated time interval once again attempt to contact those computer systems which did not respond. In the preferred embodiment of the invention, the designated time interval is one-hundred and twenty (120) seconds. If the contact in step 46 was successful, the system next proceeds to step 50. At step 50 the host runs a remote shell command. This command, which is well know in UNIX operating systems, allows the host to actually execute programs on the plurality of remote heterogeneous host computers from the host. If this command is not issued, the host will not be permitted to execute the programs on the plurality of heterogeneous computers.

At step 52 the host computer polls the plurality of heterogeneous computers which particular UNIX operating system and which revision of the UNIX operating system each one of the plurality of heterogeneous computers is using. For example, the host computer will ask each particular heterogeneous computer what operating system it is running. Each one of the plurality of heterogeneous host computers will respond with the operating system it is running such as an IBM UNIX operating system or a Hewlett-Packard UNIX operating system. Additionally, the host will also ask what the particular revision of the UNIX operating system is being used. Once this information is received by the host, in step 54, the host writes these two parcels of information into the current day's log file. Next, the host builds the host specific command lines in step 56. In order to run certain of the subsequent commands, the host needs to be able to refer to commands that are specific for the different heterogeneous computer systems.

Referring to FIG. 2, once the host computer is aware of which UNIX operating system and what revision of the system is required, the host can look to the table 15 and obtain the necessary commands to further communicate with the particular computer utilizing the UNIX operating system. Turning back to FIG. 3, once the host has built these specific command lines, the host is then able in step 58, to ask each one of the plurality of heterogeneous computer systems how busy each one of them are. This is an important question as an idle, i.e. non-busy host computer, is a wasted resource. Knowing which host computers are not busy, assists in being able to fix a problem or reallocate resources to prevent the wasting of valuable resources. Upon receipt of this information, this information is also recorded to the log file in step 60. In step 62 the host checks the network connectivity of each one of the plurality of heterogeneous computers to assist in the testing and administration done on the plurality of heterogeneous computers. Now referring to FIG. 3A, the host wants to ascertain if the desired tests are running on each one of the remote plurality of heterogeneous computers. This is done at step 64.

As indicated previously each one these heterogeneous computers has loaded on to it a suite of different test applications. For example some of the tests which could be running on the remote computers are data integrity tests, stress tests, performance tests and error injection tests. Such tests are known in the art. These tests are typically used to stress hardware and validate software. For example, as earlier indicated, if each one of the plurality of heterogeneous computers is in itself a host computer, it can then be connected to another device. Such device could be a Symmetrix® storage device manufactured by EMC Corporation of Hopkinton, Mass., assignee of the present invention. If a Symmetrix is connected to one or more of the plurality of heterogeneous computers, then tests listed above be used to test the Symmetrix storage device. The hardware can be stressed by the applicable stress tests, and the firmware can also be validated. If the desired tests are not running on the respective plurality of heterogeneous computers, then this information is recorded in the log file at step 66. If the desired tests are running on the heterogeneous computers, the host computer then needs to get the particular revision of the desired test, step 68. This is done so the host computer can keep track of the test currently being run. Since it is possible to change or enhance the tests, the host computer can then be certain each one of the plurality of heterogeneous computers is running a desired test at a desired time. This information is also recorded in the log file at step 70. As with any set of test applications, it is possible that different machines may have different versions of the application test. Once the system has the revision of the desired test, the system, in step 72, needs to restore the security features of the heterogeneous systems whereby remote programs cannot be run from the host computer. This is done at step 72. In essence, the system is restoring the security of each one of the plurality of heterogeneous computers. Once this is done and all the information is logged in the current day's log file and the system returns to the control program where indicated by C in FIG. 2. At this time, control program set forth in FIG. 2 also begins to try to re-poll the heterogeneous computers that did not respond to the polling sequence of FIG. 3 and FIG. 3A.

Figure 5:
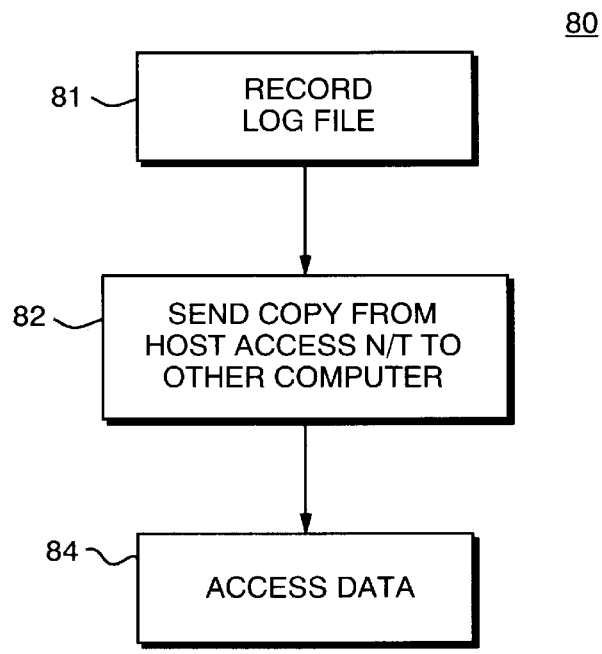
FIG. 5 is a block diagram of the host computer in another embodiment of the present invention.

Now referring to FIG. 5, it should be noted that once the host computer obtains the information required from the polling then the information can be used for a variety of purposes. FIG. 5 shows an arrangement 90 in which the host computer 12 is connected to a network 92 and such network 92 has a connection to a different operating system, in this case the Windows NT operating system indicated at 94. With the availability of the Windows NT operating system a commonly available program such as Microsoft Access database program at 96 can be run on the Windows NT system. Thus, when the host computer 12 receives all of the relevant information as a result from the polling, that information stored in the log file 18, can be sent from the host computer 12 through the network 92 and be made available to a different operating system, in this case the Windows NT operating system. With the use of the scheduler 13, the contents of the log file can be send upon the completion of the days polling.

Figure 6:
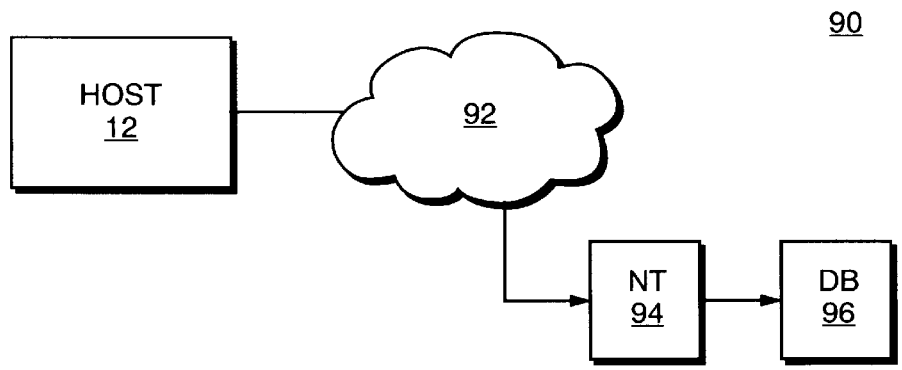
FIG. 6 is a flow diagram of an adjunct part of the method of FIG. 5 according to the method of the present invention.

It should be understood that different operating systems and different commonly available software packages could be used in this embodiment of the invention The information is then available to be automatically imported into Microsoft Access database where it can be compiled in a variety of ways, as it is well-known, to the and be easily available for analysis or to permit the manager of the polling process to easily be able to ascertain the results of the polling. This process is set out in FIG. 6. Once the log file is recorded, a copy can be sent from the log file across the network to another operating system connected to that network. Then in step 84 that data can be accessed and utilized by, for example, the Microsoft Access database.

Figure 4:
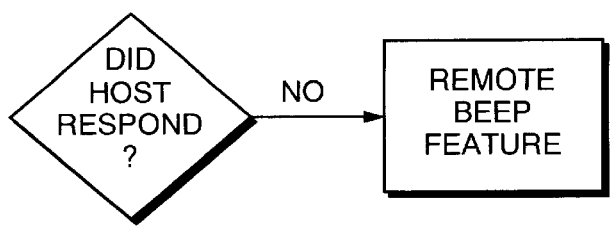
FIG. 4 is a flow diagram of an another embodiment according to the method of the present invention.

It should also be recognized within in the scope of the present invention that once it is ascertained if the host were able to be contacted, the present invention could also potentially be used for monitoring purposes. FIG. 4 demonstrates yet another use of the invention. If the polling in step 46 of FIG. 3 is not responded to, the host could log this information and send this information through the CPU into a program capable of contacting people that may need to be aware that one of the remote hosts is not working properly. A software program, such as Winbeep or PATROL sold by BMC Corporation, could be utilized with the present invention to accomplish this purpose.

Having described a preferred embodiment of the present invention, it will now become apparent to those skilled in the art that the other embodiments incorporating its concepts may be provided. It is felt therefore that this invention should not be limited to the disclosed embodiment but rather should be limited only by the spirit and the scope of the appended claims.

What is claimed is:

1. A method of polling a plurality of heterogeneous computer systems from a host computer comprising the steps of:

copying data currently stored in a first location to a second location;

deleting said data from said first location;

polling said plurality of heterogeneous computers to determine if each of said plurality of heterogeneous computers is active, wherein each of said plurality of heterogeneous computers currently active responds to said host computer;

permitting said host computer to run commands on each of said plurality of heterogeneous computers which responded to said polling;

obtaining from each of said plurality of heterogeneous computers, which responded to said polling, which operating system each of said plurality of heterogeneous computers is using;

obtaining from each of said plurality of heterogeneous computers, which responded to said polling, which version of said operating system is being used on said plurality of heterogeneous computers;

using said commands, which corresponds to said operating system and said version of said operating system, to determine if predetermined applications are being run on each of said plurality of heterogeneous computers which responded to said polling;

logging information into said first location indicating if said predetermined applications are not being run; and obtaining from each of said plurality of heterogeneous computers running said predetermined tests, which version of said predetermined applications each of said plurality of heterogeneous computers is running.

2. The method of claim 1, further comprising the steps of:

logging information into said first location indicating which of said plurality of heterogeneous computers did not respond to said polling; and polling for a second time, after a predetermined period of time, each of said plurality of heterogeneous computers which did not respond to said polling.

3. The method of claim 2, further comprising the steps of:

logging information into said first location indicating which of said plurality of heterogeneous computers did not respond to said polling for a second time.

4. The method of claim 3, further comprising the steps of:

logging information into said first location indicating said operating system and said version of said operating system on each of said plurality of heterogeneous computers; and using said operating system and said version information to build said commands.

5. The method of claim 4, further comprising the step of:

logging into said host computer as a root user.

6. The method of claim 5, further comprising the step of:

ascertaining if each of said plurality of heterogeneous computers is connected to a network wherein said network includes said host computer.

7. The method of claim 6, further comprising the step of:

ending, for said host computer, the ability to permit said host computer to run said commands for said plurality of heterogeneous computers.

8. The method of claim 7, wherein said plurality of heterogeneous computers is in a location remote from said host computer; and wherein each of said plurality of heterogeneous computers act as a host computer.

9. The method of claim 8, wherein each of said plurality of heterogeneous computers is connected to a storage device and each of said plurality of heterogeneous computers is running said predetermined applications for said storage devices.

* * * * *